(No Model.)
A. TWYMAN.
CONICAL WHEEL.
No. 387,191. Patented July 31, 1888.
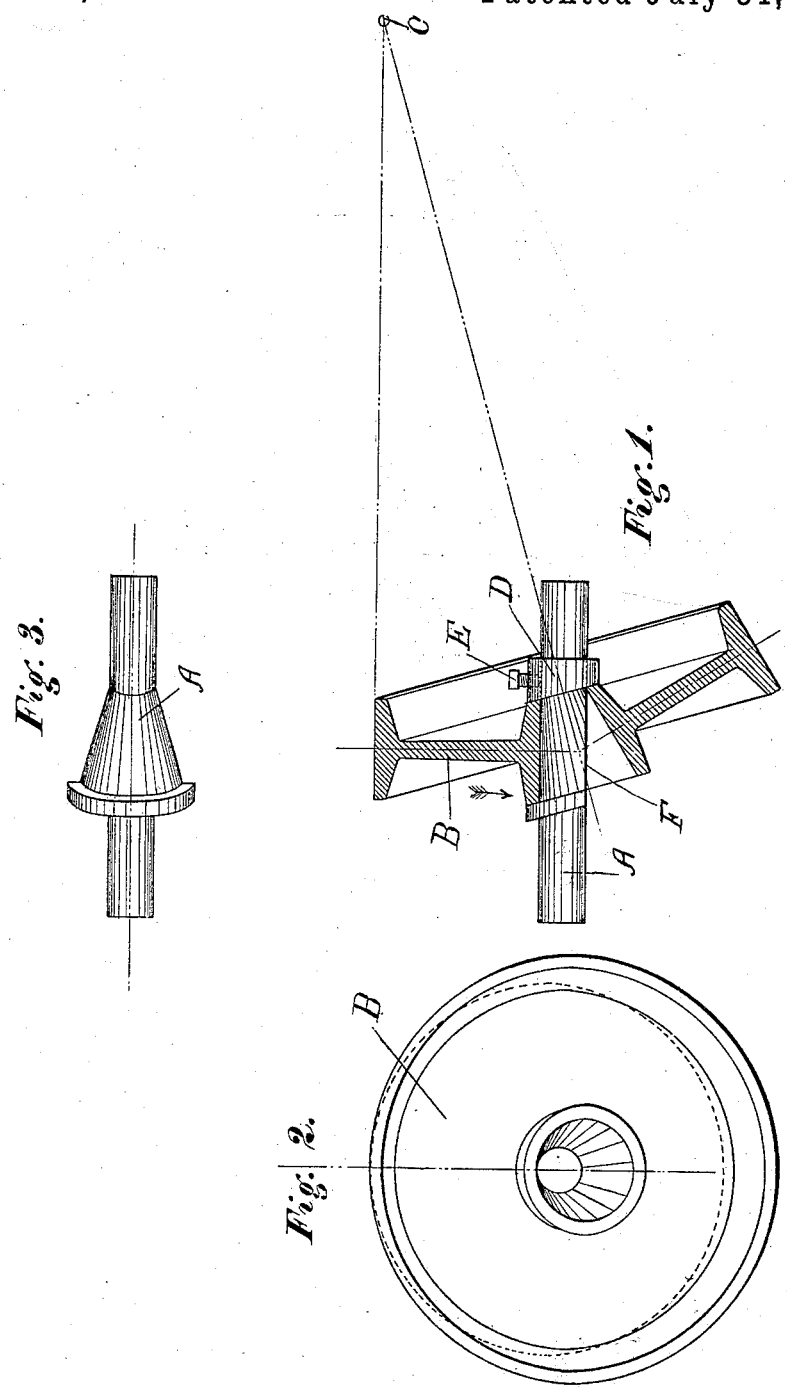
WITNESSES.
Henry Howard Sessions.
August Rapp.
INVENTOR.
Aaron Twyman.

UNITED STATES PATENT OFFICE.

AARON TWYMAN, OF PULLMAN, ILLINOIS.

CONICAL WHEEL.

SPECIFICATION forming part of Letters Patent No. 387,191, dated July 31, 1888.

Application filed October 7, 1887. Serial No. 251,773. (No model.)

*To all whom it may concern:*

Be it known that I, AARON TWYMAN, a subject of the Queen of Great Britain, residing at Pullman, in the county of Cook and State of Illinois, have invented certain new and useful Improvements in Conical Wheels, of which the following is a specification.

In certain trains of mechanism it is desirable to provide for the rotation of one piece, upon or against another, around a pivotal point or center, and at the same time to support the weight of the one piece upon or against the other piece under such favorable conditions as to reduce the frictional resistances to such rotation to a minimum.

One of the methods by which this end may be accomplished is by the use of wheels of a conical form, which, being arranged around and with their axes radial to the pivotal point, may be supported upon journals in the line of their axes by one of the pieces, and can be made to support the other piece upon the conical peripheral surface of the wheels. On an examination of the dynamical conditions induced by this arrangement of a series of conical wheels, between two pieces, rotating the one upon the other, around a pivotal point, it will be seen that, first, if the axes (and journals) of the conical wheels are arranged to be level or upon one plane then the supporting-surface of the wheels will present an angle with the said plane, which increases in a direct ratio to their diameter, and that, consequently, there will be a lateral thrust upon the wheels, the extent of which will be the product of the weight to be supported and a factor of the said angle; second, if the supporting-surfaces of the conical wheels are arranged to be level or upon one plane, then their axes (and journals) will similarly present an angle which increases in a direct ratio to their diameter, and that in this case there will be an end or lateral thrust upon the journals.

My invention is designed to prevent the lateral thrust when using conical wheels to provide for the support and rotation of one piece upon or against another piece around a pivotal point or center.

In the practical application of my invention it may be found desirable to employ it in connection with the side bearings of a car-truck, the wheels under a turn-table, under the revolving parts of an observatory, and any structures requiring similar provisions.

In the accompanying drawings, which form part of this specification, and in which the same letters indicate the same or like parts, Figure 1 is a sectional view through the center of a conical wheel, showing the journal upon which the wheel revolves. Fig. 2 is a front view of the wheel, and Fig. 3 is a plan view of the journal.

A is a journal which is supported, so that the upper part of its surface shall be level from end to end, or at right angles to the direction of the resultant of the pressure of the piece or pieces to be supported by it.

B is a conical wheel, the outer peripheral surface of which forms a frustum of a cone, the apex of which, if produced, is at or near a pivotal point, C, and the supporting-surface of which is level or at right angles to the direction of pressure of the piece or pieces to be supported by it. For convenience of manufacture, the under portion of said journal or cone is flattened, as shown at F. The under portion of the cone, however, plays no part in supporting the wheel, and may be left out or not, as convenience may dictate.

C is a pivotal point, around which any part of a train of mechanism resting upon or against the surface of B may be made to rotate.

D is a collar, and E a set-screw.

The conical wheel B is formed with a journal-bearing at its center, the surface of which is concentric and parallel, or approximately parallel, with its outer peripheral surface, the two surfaces being frusta of two similar cones, or so nearly similar that the journal-bearing shall present its surface from end to end at right angles to the line of the resultant of the pressure or pressures transmitted by and through the said wheel to the surface of the said journal-bearing.

The journal A is a section of a cone, and that portion of its outer surface which supports the journal-bearing of the conical wheel B being concentric and parallel with the surface of the said journal-bearing any pressure at right angles to the said journal-bearing will also be at right angles to the surface of the journal.

All surfaces which present an angle with a level plane against the perpendicular pressure of any piece, or which present an angle other than a right angle against the direction of the line of pressure of any piece to be supported by the conical wheel, being thus eliminated it will be seen that no lateral thrust can be exerted either against the wheel or journal.

The adjustment, in exact concentricity or parallelism, of the outer peripheral surface with the surface of the journal-bearing of the conical wheel may not be necessary, as the exigencies of construction and certain allowances, which may have to be made for the action of centrifugal force, gravity, and frictional resistances, might render deviations advisable or necessary.

What I claim, and desire to secure by Letters Patent, is—

1. A wheel having its circumference radically conical and provided at its center with a journal-bearing, the surface of which is concentric and parallel with the outer peripheral surface of the wheel, whereby to present a bearing-surface at right angles to the resultant of the pressure upon said wheel, substantially as shown and described.

2. The combination of a conical journal and a wheel or pulley having a central journal-bearing made conical and fitted to the journal, substantially as set forth.

3. The combination, with a pulley or wheel having a conical bearing, of a conical journal having a bearing-surface at right angles to the line of the resultant of the pressure upon said bearing and a detachable collar, the abutting surfaces of said collar and wheel being at right angles to the axis of the bearing and secured substantially as shown and described.

AARON TWYMAN.

Witnesses:
HENRY H. SESSIONS,
AUGUST RAPP.